(12) United States Patent
Arrigotti et al.

(10) Patent No.: US 10,416,657 B2
(45) Date of Patent: *Sep. 17, 2019

(54) MODIFYING A DIGITAL OPHTHALMIC LENS MAP TO ACCOMMODATE CHARACTERISTICS OF A LENS SURFACING MACHINE

(71) Applicant: Digital Vision, Inc., Portland, OR (US)

(72) Inventors: Stan Arrigotti, Portland, OR (US); Douglas S. Hagen, Portland, OR (US)

(73) Assignee: Digital Vision, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,479

(22) Filed: Apr. 16, 2018

(65) Prior Publication Data

US 2018/0231951 A1    Aug. 16, 2018

Related U.S. Application Data

(63) Continuation of application No. 14/242,780, filed on Apr. 1, 2014, now Pat. No. 9,952,584.

(51) Int. Cl.
*G05B 19/4097* (2006.01)
*G05B 19/18* (2006.01)
(Continued)

(52) U.S. Cl.
CPC .......... *G05B 19/4099* (2013.01); *B24B 13/00* (2013.01); *G05B 19/182* (2013.01);
(Continued)

(58) Field of Classification Search
CPC .......... G05B 2219/32144; G05B 2219/33269; G05B 2219/33271; G05B 2219/36349; G05B 2219/45055; G05B 2219/45157; G05B 2219/49001; G05B 19/182; G05B 19/19; G05B 19/402; G05B 19/404; G05B 19/4086; G05B 19/4097; G05B 19/4099; G02C 7/02–028; B24B 13/00–0025; B24B 13/06–065
(Continued)

(56) References Cited

U.S. PATENT DOCUMENTS 5,217,335 A     6/1993  Houchens, Jr. et al.
5,550,599 A *   8/1996  Jannard .................... G02C 7/02
                                                351/159.02
(Continued)

FOREIGN PATENT DOCUMENTS

WO     2002037168 A2   5/2002

OTHER PUBLICATIONS

Meister, D. "The Optics of Free-Form Progressive Lenses," 20/20 mag. (online), Oct. 2008. Retrieved Dec. 6, 2017 <https://www.2020mag.com/ce/the-optics-of-free-form>. 10 pages.

*Primary Examiner* — Todd Aguilera
(74) *Attorney, Agent, or Firm* — Perkins Coie LLP

(57) ABSTRACT

A system that can analyze and modify a point map file corresponding to a lens design is described. The lens design is optimized to meet a patient's ophthalmic prescription. However, a digital surfacing machine may not be physically capable of producing on a lens blank a lens curvature required by the prescription and defined by the point map file. The system takes into account limitations of physical characteristics of the digital surfacing machine, such as the diameter and speed of movement of the cutting tool, and modifies the point map file so that the digital surfacing machine can produce the lens curvature on the lens blank.

20 Claims, 15 Drawing Sheets

(51) Int. Cl.
    *G05B 19/402*     (2006.01)
    *B24B 13/00*     (2006.01)
    *G05B 19/4099*     (2006.01)

(52) U.S. Cl.
    CPC ....... *G05B 19/402* (2013.01); *G05B 19/4097* (2013.01); *G05B 2219/45044* (2013.01); *G05B 2219/45157* (2013.01); *G05B 2219/49001* (2013.01)

(58) Field of Classification Search
    USPC ......... 700/97, 103, 105, 159–160, 164, 187, 700/194; 351/159.73–159.81; 451/42
    See application file for complete search history.

(56) References Cited

U.S. PATENT DOCUMENTS

| | | |
|---|---|---|
| 6,142,628 A | 11/2000 | Saigo et al. |
| 6,817,713 B2 | 11/2004 | Ueno et al. |
| 7,188,082 B2 | 3/2007 | Keane et al. |
| 8,002,406 B2 | 8/2011 | Arrigotti et al. |
| 8,014,894 B2 | 9/2011 | Kendig et al. |
| 8,340,799 B2 | 12/2012 | Hagen et al. |
| 8,599,301 B2 | 12/2013 | Dowski, Jr. et al. |
| 8,639,372 B2 | 1/2014 | Hagen et al. |
| 8,641,192 B2 | 2/2014 | Arrigotti et al. |
| 9,039,170 B2 | 5/2015 | Arrigotti et al. |
| 9,057,886 B2 | 6/2015 | McCarty et al. |
| 9,671,624 B2 | 6/2017 | Hagen et al. |
| 9,952,584 B2 | 4/2018 | Arrigotti et al. |
| 2002/0176052 A1 | 11/2002 | Ueno et al. |
| 2008/0110306 A1 | 5/2008 | Kendig et al. |
| 2010/0023555 A1 | 1/2010 | Macaskill et al. |
| 2010/0165134 A1 | 7/2010 | Dowski, Jr. et al. |
| 2011/0297559 A1 | 12/2011 | Davis et al. |
| 2012/0262668 A1 | 10/2012 | McCarty et al. |
| 2013/0297057 A1 | 11/2013 | Wildsmith et al. |
| 2014/0016088 A1 | 1/2014 | De Rossi et al. |

\* cited by examiner

505 {
```
TRAY   ACCT.      RX#      PATIENT VIS    POE INV.# 900039
9090   CHEYEN              PT NAME  ******03/03/14 05:16P
HAWAII OPTICAL                       :503-231-6606  11    JK 33
                                   *REP*03/032014 DVI Worksho
```

510 {
```
 DIGITAL*  +1.74        DIST   NEAR
R  +1.95w  -0.21    91    29.5  27.0
   SPHERE    CYL   AXIS    59.0  54.0           ΔIN/OUT   ΔUP/DN
L  +1.71w  -0.71   100    29.5  27.0
           +1.00    HORZ TOL→ 3.6  VERT TOL →1.2
R  7.0w  2.5*  17.5    21.5       2.2pf  4.5    5.0
    DEC   INSET  OC HEIGHT SEG HEIGHT  THINNEST THICKEST CTR THICK
L  7.0w  2.5*  17.5    21.5       2.2pf  4.0    4.4
```

520 {
```
                              LENS STOCK
S  SEE MORE HD        ESn79 TGY        5.50       175  SV
   STYLE  TPY/TPY    MFR SZ COLOR COAT FRONT CURVE  ADD
S  SEE MORE HD        ESn79 TGY        5.50       175  SV
                                FRAME
```

525 {
```
  E   7614                                              SILH
      54 19                    ST  METL
```

```
                              SURFACING
R  B  5.0  +4.0  dig      359     58   66   5.37    1.53
   GRIND  IN  DOWN  CYL AXIS  ΔAXIS  BLOCK CRB TRUE CURVE  SAG
L  B  5.0  +4.0  dig      175     58   66   5.37    1.53
```

530 {
```
R  0.92b  -3.71  -3.90   7.6   15.4   9.6     2.7   3.8
   BLOCK Δ GEN BASE GEN CROSS GEN FRONT GEN TK BTHK  Δ APEX Δ BASE
L  0.58b  -3.91  -4.55   7.0   15.0   9.6     2.7   3.7

R  -3.71  -3.90   0.19     -1.41   -1.48    7.6  12.2
   TOOL BASE TOOL CROSS TOTAL CYL  BASE SAG  CROSS SAG  TVAL  SVAL
L  -3.91  -4.55   0.64     -1.48   -1.73    7.0  12.2
                     ROLL & POLISH EDGES
```

535 {
```
ROLL & POLISH EDGES [RPE2]   FINISHING                 5:00 P
R  7.0  P  +4.0+   21.5      7.0        8.9  DBL 19.0    0.2
   INSET   DOWN  SEG HEIGHT   PRIN      CLEAR  EO  59.6/029
L  7.0  P  +4.0+   21.5      7.0        8.9  FPO 73.0    0.2
   SET   POLISH METL    PATTERN d CRC   OVER PBOX  HOAZ  VERT
36.5  RIMLESS DRILL 4  @0029X  152.4   0.0  54.0  54.0  35.2
       TINT                    COAT
```

*FIG. 5A*

MODIFYING A DIGITAL OPHTHALMIC LENS MAP TO ACCOMMODATE CHARACTERISTICS OF A LENS SURFACING MACHINE

CROSS-REFERENCES TO RELATED APPLICATIONS

This application is a continuation application of U.S. patent application Ser. No. 14/242,780, filed on Apr. 1, 2014, now U.S. Pat. No. 9,952,584, which is hereby incorporated herein in its entirety by reference for all purposes.

BACKGROUND

Digital surfacing of lens blanks is a process used to produce ophthalmic lenses, such as advanced progressive lenses. With digital surfacing, customized surface curvatures can be produced on a lens blank that is adapted to a patient's lens prescription and frame parameters. The particular surface curvatures to be machined on the lens blank is based on a lens design that is created by a lens designer. The lens design is provided to a digital surfacing machine in the format of a point map file that describes a desired surface curvature of the lens blank.

BRIEF DESCRIPTION OF THE DRAWINGS

Examples of an electronic optical lens processing system are illustrated in the figures. The examples and figures are illustrative rather than limiting.

FIG. 2 shows an example of a prior art eyeglass lens prescription entry form.

FIG. 5A shows an example work ticket where lens processing parameters are displayed on a form.

DETAILED DESCRIPTION

Overview

Described in detail below is a system that can adjust a point map file corresponding to a lens design optimized to meet a patient's ophthalmic prescription, where the point map file specifies the curvature of a surface of a lens. The adjustments are based on limitations of physical characteristics of a digital surfacing machine that will be used to machine the lens from a lens blank. Examples of physical characteristics that effect the type of surface curvatures that can be created on a lens blank include the diameter of a lens cutting tool, the rotational speed of the lens blank being cut by the cutting tool, the speed of the cutting tool in a direction generally perpendicular to the lens, and the speed of the cutting tool in a radial direction of the lens.

Various aspects and examples of the embodiments will now be described. The following description provides specific details for a thorough understanding and enabling description of these examples. One skilled in the art will understand, however, that the embodiments may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Figure 1:
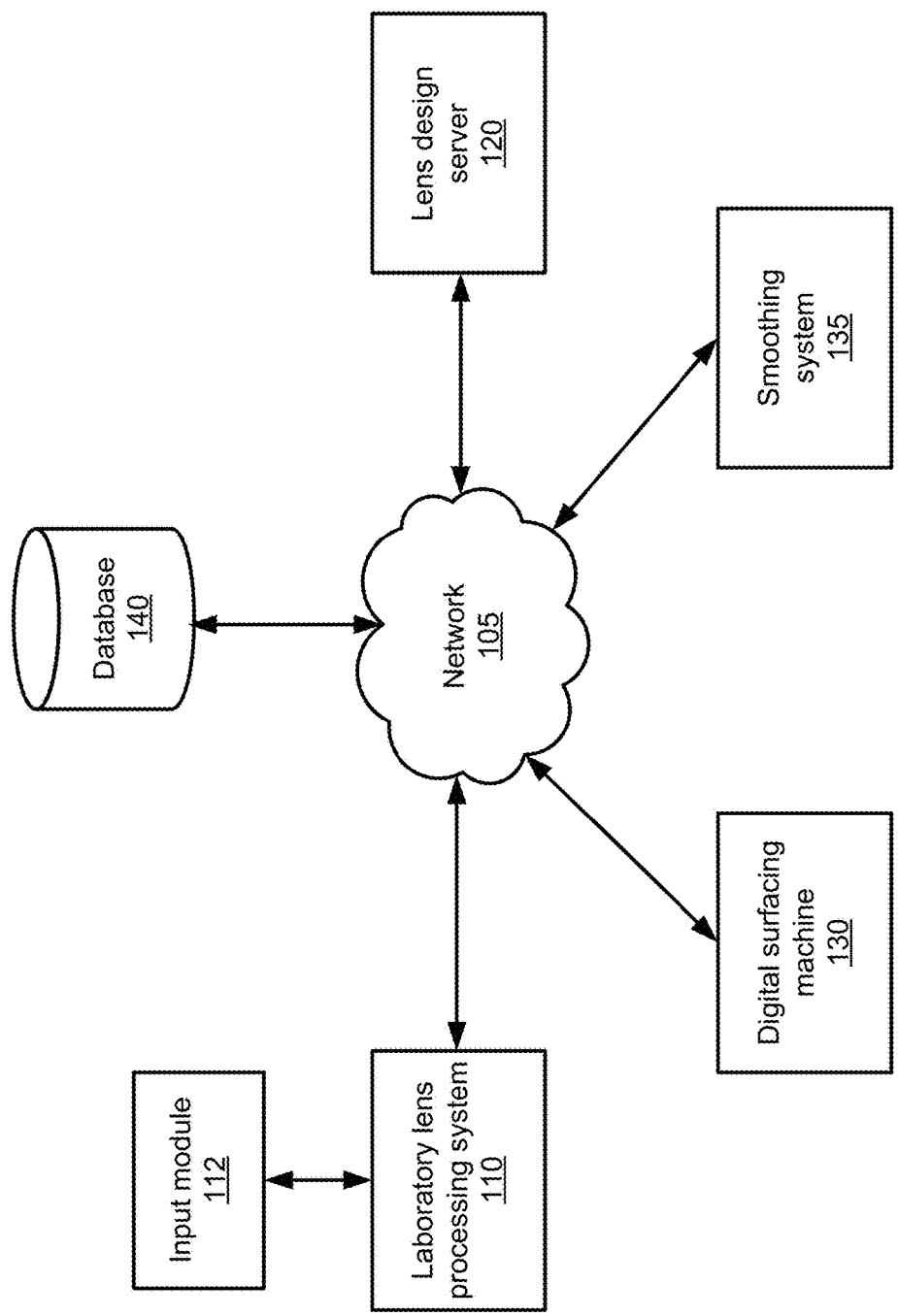
FIG. 1 shows a block diagram of an example environment in which a laboratory lens processing system tracks lens design products.

FIG. 1 shows a block diagram of an example environment in which a laboratory lens processing system 110 facilitates the manufacture of ophthalmic lenses. The laboratory lens processing system 110 can interact with one or more lens design servers 120, one or more digital surfacing machines 130, one or more smoothing systems 135; and one or more databases 140. The lens design servers 120 calculate a lens design to meet a patient's prescription requirements and generate a corresponding point map file defining a surface contour, wherein the point map file is used by a digital surfacing machine for creating the surface on a lens blank. The smoothing system 135 analyzes the point map file and smooths the surface curvature defined by the point map file so that the digital surfacing machine 130 can physically manufacture the lens. The digital surfacing machines 130 create a specified lens design to the surface(s) of a lens blank to create a prescription lens for the patient. Finally, the databases 140 store information about the lens designs used to manufacture lenses, point map files, and physical characteristics of the digital surfacing machines 130.

The laboratory lens processing system 110 initially receives an eyeglass prescription for a patient along with lens parameters and information about the patient's selected frames. The prescription lens information, lens parameters, and frame parameters can be entered directly into an electronic eyeglass or lens ordering system by the ECP at input module 112 and then exported to the laboratory lens processing system 110. Alternatively, the prescription can be entered manually into the laboratory lens processing system 110, for example, by data entry personnel.

Figure 2:
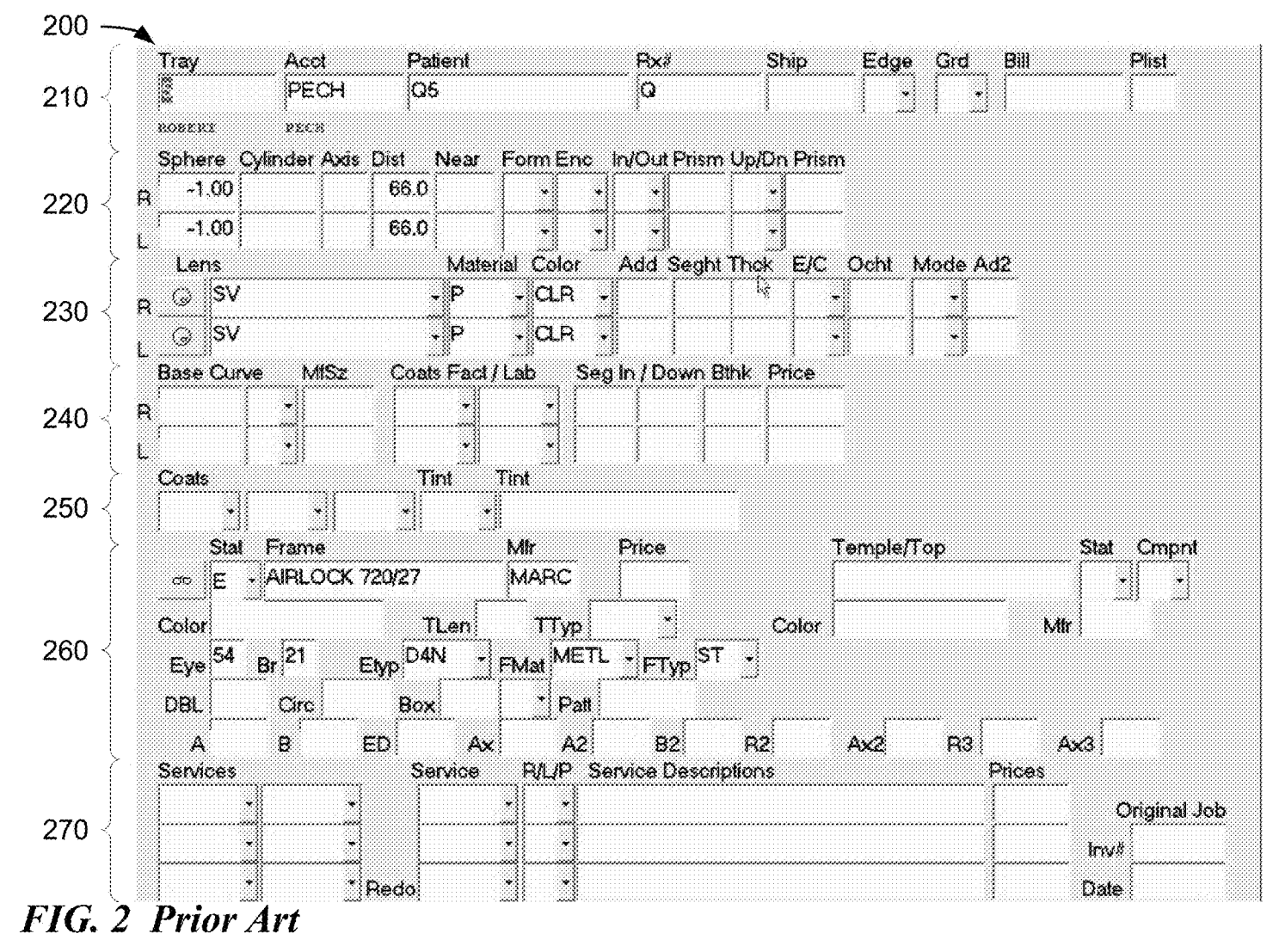

FIG. 2 shows an example of a prior art prescription lens entry form 200 for an electronic ordering system used by an eye care professional (ECP), as described in U.S. Pat. No. 7,188,082 and is incorporated herein by reference. Information used to identify the patient and the ECP are provided in section 210. The prescription for the eyeglass lenses is entered in section 220. Prescription information includes, but is not limited to, spherical power, cylindrical power, and cylindrical axis of each lens ordered. At section 230, specific information about the lenses, for example, the style of the lens (single vision, bifocal, etc.), lens material (polycarbonate, glass, etc.) and lens color or tinting, can be specified. Further information about customizing the lenses to the patient's preferences, such as lens coatings, can be entered in sections 240 and 250. Section 260 allows the ECP to enter information about the patient's chosen frames. And section 270 provides pricing and other customized services requested by the ECP and/or the patient.

Once the prescription information is made available to the laboratory lens processing system 110, the system sends the prescription, lens parameters, and/or frame parameters to a digital lens design server 120. The lens parameters can include lens styling information, such as the type of lens blank to use. Then the lens design server 120 calculates a custom lens design for the patient's lens using the provided information. Typically, the lens design is generated for the ocular or back surface of the lens that will be positioned closer to the patient's eye. However, the lens design can be generated for the front surface of the lens, or lens designs can be generated for both front and back lens surfaces. In some cases, the lens design server 120 can simply be a software module that runs on the laboratory lens processing system 110, rather than a standalone server.

The calculated lens design is provided by the lens design server 120 in the form of, e.g., a point map file, also referred to as a height map file. The data in the point map file describes the curvature of the surface of the lens to be machined on a lens blank. For example, the point map file can include data for an area having a predetermined size, for example 80 mm$^2$, that has an X-coordinate for the height of the lens surface at specific Y- and Z-coordinates that correspond to locations on the surface of the lens to be machined.

The lens design and corresponding point map file generated by the lens design server 120 can be associated with a specific brand name and the lens design manufacturer. Thus, although the generated lens design and point map file have no physical packaging, they can still can be assigned a specific brand name that is associated with the lens design manufacturer. Then the lens design can be tracked to confirm that the correct lens design has been surfaced onto the lens during the manufacturing process. The point map file, the brand name, and/or the lens design manufacturer can be stored by the lens design server 120 in the database 140. The database 140 can be a centralized or distributed database. Further, access to the database 140 can be provided by a database server.

After the point map file is stored in the database 140 by the lens design server 120, the smoothing system 135 analyzes the point map file to determine whether the digital surfacing machine 130 can physically cut the lens design specified by the point map file. For example, if changes in the curvature of the lens surface specified by the point map file are too sharp or abrupt for the digital surfacing machine 130 to reproduce, the smoothing system 135 modifies the relevant portions of the point map file to reduce the abruptness or steepness of the specified surface curvature. The smoothing system 135 accesses information about the physical characteristics of the digital surfacing machine 130 that is stored in the database 140. Examples of physical characteristics that can be stored in the database 140 include the diameter of the cutting tool of the digital surfacing machine, the turning speed of the lens as the lens is being surfaced, the speed of the cutting point in a radial direction of the lens, and the speed of the cutting tool in a direction generally perpendicular to the lens, i.e., toward or away from the lens. In addition to requesting the point map file from the lens design server 120, the laboratory lens processing system 110 also generates a work ticket or work order for use by a laboratory technician for manufacturing a custom pair of eyeglass lenses that meets the prescription requirements. As part of the manufacturing process, a digital surfacing machine 130 at the manufacturing facility accesses the point map file stored in the database 140 specified by the work ticket. The digital surfacing machine 130 uses the point map file to machine the surface of the lens blank.

FIG. 1 shows that communications among the laboratory lens processing system 110, the lens design servers 120, the digital surfacing machines 130, and the databases 140 are sent via a network 105, such as a local area network (LAN), a wide area network (WAN), or the Internet. However, in some instances, one or more of the laboratory lens processing system 110, the lens design servers 120, the digital surfacing machines 130, and the databases 140 can be directly coupled.

Suitable Processes and Interfaces

Figure 3A:
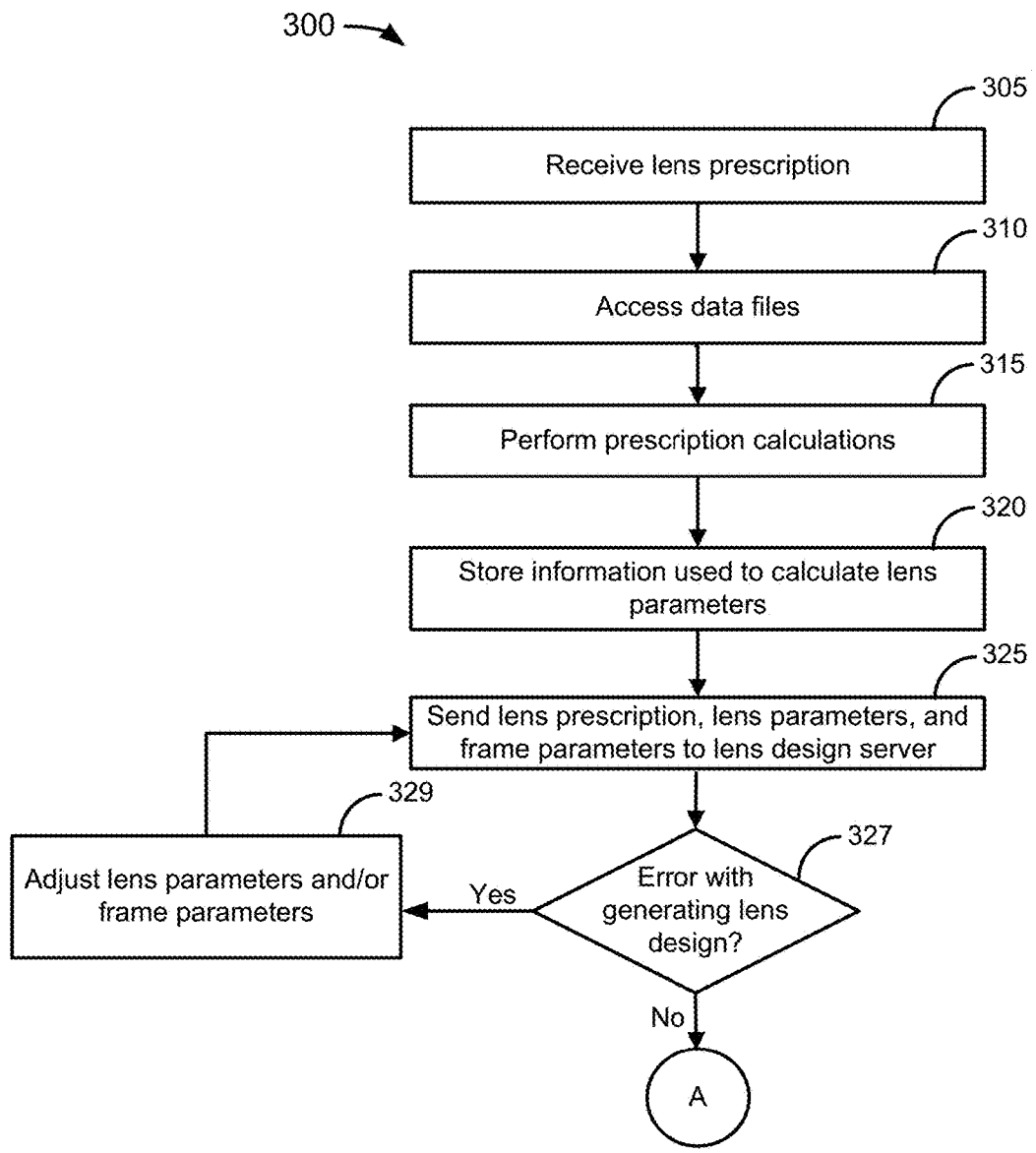
FIGS. 3A-3B is a flow chart illustrating an example method for generating a work ticket.
Figure 3B:
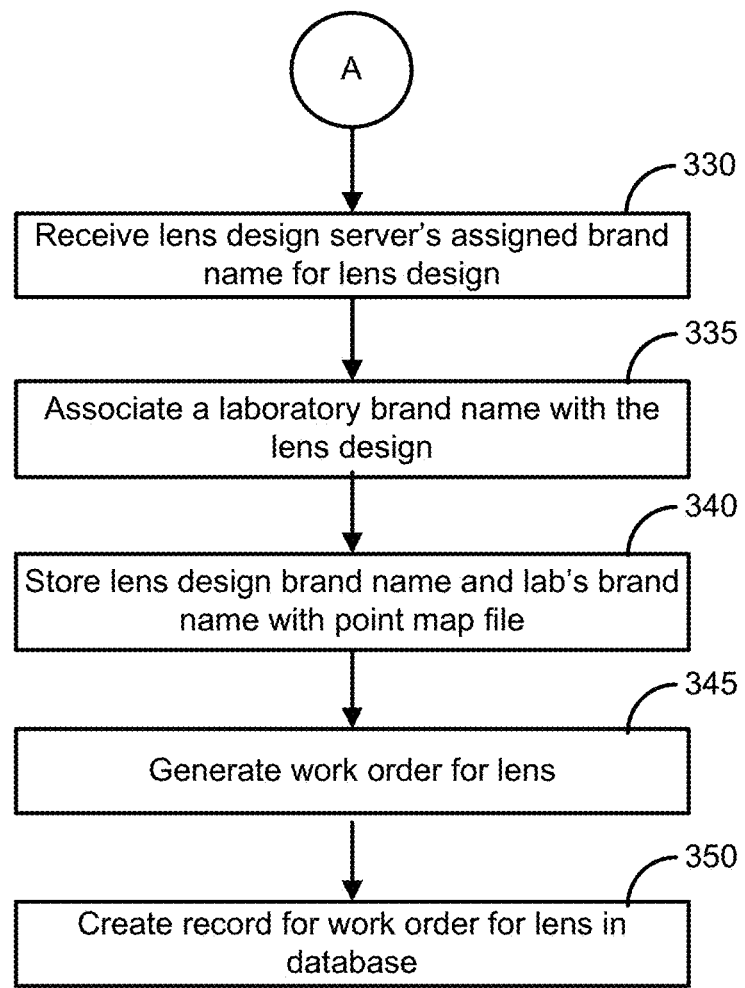

FIGS. 3A-3B is a flow chart illustrating an example of a method 300 of generating a work ticket for manufacturing a lens for an eyeglass prescription. At block 305, the laboratory lens processing (LLP) system receives a lens prescription that has been ordered by an ECP. The lens prescription can include, but is not limited to, information shown in the example prescription entry form shown in FIG. 2.

At block 310, the LLP system accesses data files to perform lens layout calculations and determine appropriate lens tool settings for manufacturing a custom lens. Examples of accessed data files include, but are not limited to, lens stock data, frame stock data, surfacing data, finishing data, and other miscellaneous data files.

Examples of lens stock data include style attributes, such as minimum fitting height for progressive lenses; material attributes, such as tintability and compatibility with various coatings; recommended lens base curve selection information for use with particular eyeglass prescriptions; lens technical information, such as lens blank dimensions and curve measurements; lens inventory in the laboratory; and lens pick lists for which manufacturer's lens blank and which lens size to use for a given prescription, ranked according to the laboratory's preferences. Examples of frame stock data includes size and color availability; whether a frame is available for requested eye, bridge, and/or temple measurements; and technical details, such as the minimum lens edge thickness and compatible lens base curve. Examples of surfacing data include setup files for the generator, i.e. surfacing machine; prism data that tells how much prism the generator is capable of producing in a generated lens; information about the dimensions of the blocks used to hold the lenses in the generator; information about the tools the generator uses to grind lenses and the pads placed on the tools, such as the diameter and curvature of the tools and thickness of the pads; and gauge data that provides the type of gauge used to measure the lens curves and thicknesses. Examples of finish data include whether a coating is compatible with a particular tint or lens material; adjustments made to the prescription to account for the way the frame fits on a patient's face; and the position and shape of drill holes. Examples of other data files include information that flags preferences or warnings that are specific to a particular account and/or doctor, such as a doctor or patient/patient group specifying an anti-reflective coating on every order.

In one example where data files need to be accessed, a lens manufacturing tool called a lap is used. The lap tool has a particular curve and is covered with abrasive pads of various types and thicknesses that grind a lens blank of a chosen material to alter the curvature of the lens blank to produce the desired lens geometry. Lap tools are available in different increments and with certain calibration values. A typical eyeglass manufacturing facility has an inventory of approximately 6000 lap tools. For each prescription, the optimum lap tools should be chosen that are most suitable for creating a lens for that prescription. Consequently, information related to the lap tools used by a particular laboratory should be accessible by the system to select appropriate tool settings during the lens processing calculations. Because the pads, the tool increments, and the way the tools are cut all impact the selection of the lap tools for a particular job, it can be beneficial for a laboratory technician to be able to access the selection information through a tooltip system (described more fully herein). The supplemental information provided through tooltips not only allows the laboratory technician to check the tool, but also to learn why the system selected certain tools and parameters for the manufacturing process.

Then at block 315, the LLP system uses the data in the files accessed at block 310 to perform a prescription calculation for generating the prescribed lens. Input information for the lens calculations include, but is not limited to, the lens prescription order information and the frame information, such as the shape of the frame, and the other data files listed above. One calculation selects the appropriate lens based upon data such as the patient's measurements, the power of the patient's prescription, and set up files for the generator for the particular laboratory. Another calculation involves calculating the cosmetics of the job based upon data such as the frame, the lens, the prescription, and calculating the thickness over the entire lens. Similarly, all of the surfacing, fining, and polishing information for a lens require calculations by the system Thus, information generated by the lens calculations include, but is not limited to, the specific lens tools to be used such as the lap tools and blocks to be used during the lens manufacturing process, calculations of the final thickness of the lens over the entire lens surface, and the work ticket calculations for surfacing and finishing the lens.

At block 320, the LLP system stores information used during the lens calculation to generate the prescribed lens. In some cases, not all of the information and calculations generated by the system during the prescription calculations need to be stored, only enough information needed to re-calculate any supplemental information needed by the lab technician when requested with tooltips, an intuitive user interface to be described below. Alternatively, the system can store all the values and parameters determined during the prescription calculations as supplemental information for display when requested through tooltips. With tooltips, a laboratory technician can access the stored information during processing of the lens as needed.

Next, at block 325, the LLP system sends the lens prescription, lens parameters, and/or frame parameters to the lens design server for calculating a customized lens surface that is optimized for the patient's data. At decision block 327, the LLP system determines whether an error has been received from the lens design server for generating the lens design. An error may be triggered if the provided lens prescription, lens parameters, and/or frame parameters are incompatible with lens designs that are provided by the lens design server, as the lens design manufacturer may have rigid specifications for the lens blank on which a particular lens design can be machined. For example, a specified lens blank thickness may not be sufficiently thick to prevent sharp edges if a calculated lens design is machined on the lens blank, as described in U.S. Pat. No. 8,002,406.

If an error message is received (block 327—Yes), at block 329, the LLP system adjusts the lens parameters and/or frame parameters, and the process returns to block 325. If no error message is received (block 327—No), the customized lens surface is calculated and stored as a point map file by the lens design server in a database accessible by a digital surfacing or lens grinding machine in the lens manufacturing facility.

At block 330, the brand name for the lens design created by the lens design server is received by the LLP system from the lens design server. Other source information for the point map file can also be sent by the lens design server, for example, the name of the lens design manufacturer; contact information for the manufacturer; a website for the manufacturer; links to a website for the manufacturer; links to logos, icons, or digital images for the manufacturer and/or brand; stylized scripts and/or fonts; and links to advertising campaigns.

Next, at block 335, the LLP system associates a laboratory brand name for the lens to be manufactured with the point map file of the created lens design. And at block 340, the LLP system stores in a database the laboratory brand name along with source information for the point map file, for example, the brand name for the lens design, the lens design manufacturer, and information sent to the lens design server 120 for generating the lens design, such as the type of lens blank to be used for machining the surface curvature described by the point map file. By associating the laboratory brand name with the source information for the point map file in a database, the LLP system can look up tracking information as to which lens design was used to manufacture a specific lens and other provided information regarding the use of the point map file.

Then at block 345, the LLP system generates the work order for the prescription lens. In addition to the processing steps for manufacturing the lens, the work order includes the laboratory brand for the lens to be manufactured. The work order can have the format of a form, for example the form 500A shown below in FIG. 5A. Additionally or alternatively, the work order can have a graphical format, for example the graphic 500B shown below in FIG. 5B. The graphic is a picture of the lens or lenses 550, 552 to be manufactured superimposed on the lens blank 555, 557 to be used.

At block 350, the LLP system creates a record for the work order for the lens in the database. The work order can then be printed by a laboratory technician for use during the manufacturing process of the lens, accessed using an electronic display, and/or accessed by the digital surfacing machine to determine the appropriate point map file stored in the database to use for machining the lens.

Figure 4:
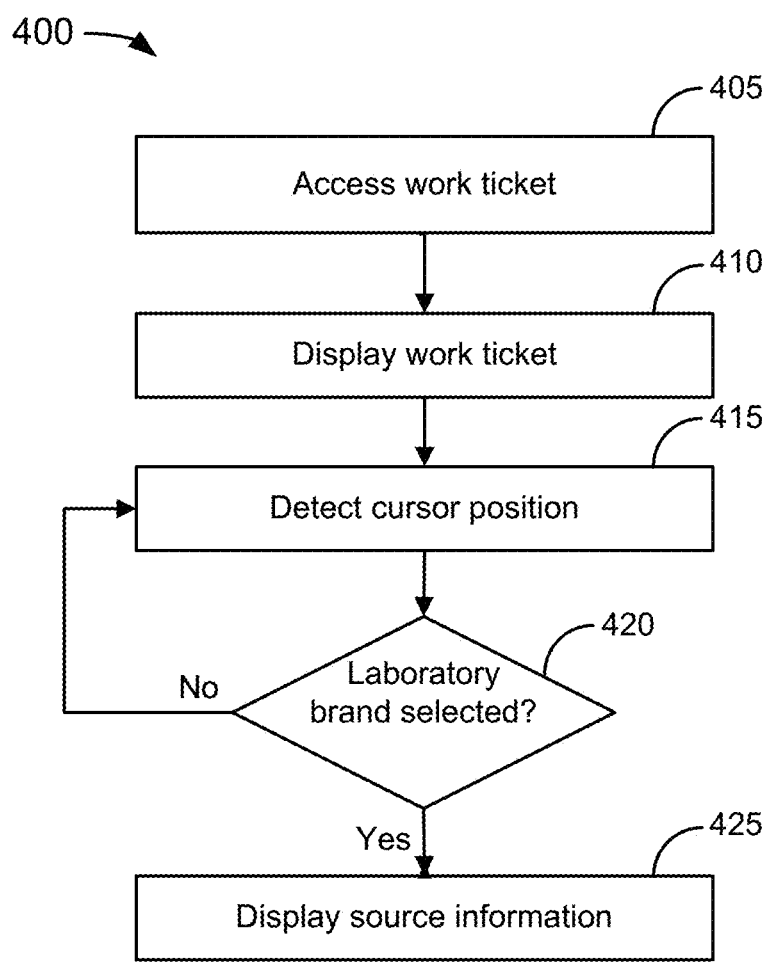
FIG. 4 is a flow chart illustrating an example method for displaying source information for a lens design used in manufacturing a lens.

FIG. 4 is a flow chart illustrating an example of a method 400 of displaying source information for a lens design used in manufacturing a lens. A tooltip graphical user interface (GUI) element is employed with this method.

At block 405, the system accesses the work ticket generated at block 345 of FIG. 3B. The system accessing the work ticket at block 405 may or may not be the same as the system that generated the work ticket. The system then displays the work ticket on an electronic screen at block 410.

The electronic screen should be remotely accessible by a user through the use of an input device, such as a mouse, to move a cursor over the work ticket displayed on the screen. The user selects elements of interest from the work ticket to obtain additional information. For example, the user can select the laboratory brand name for the lens to be manufactured to obtain source information for the lens design used for manufacturing the lens. Of course, the system may use a touch screen interface, voice input, or other input technologies.

Movements of the cursor made by the user on the display are detected by the system at block 415. Then at decision block 420, the system determines whether the laboratory brand for the lens has been selected by the user. A user can select the laboratory brand or any other element on the work ticket by moving the cursor on or near the element. If the cursor has not been moved or has not been moved on or near the laboratory brand (block 420—No), the process returns to block 415 to detect cursor movement.

Figure 6:
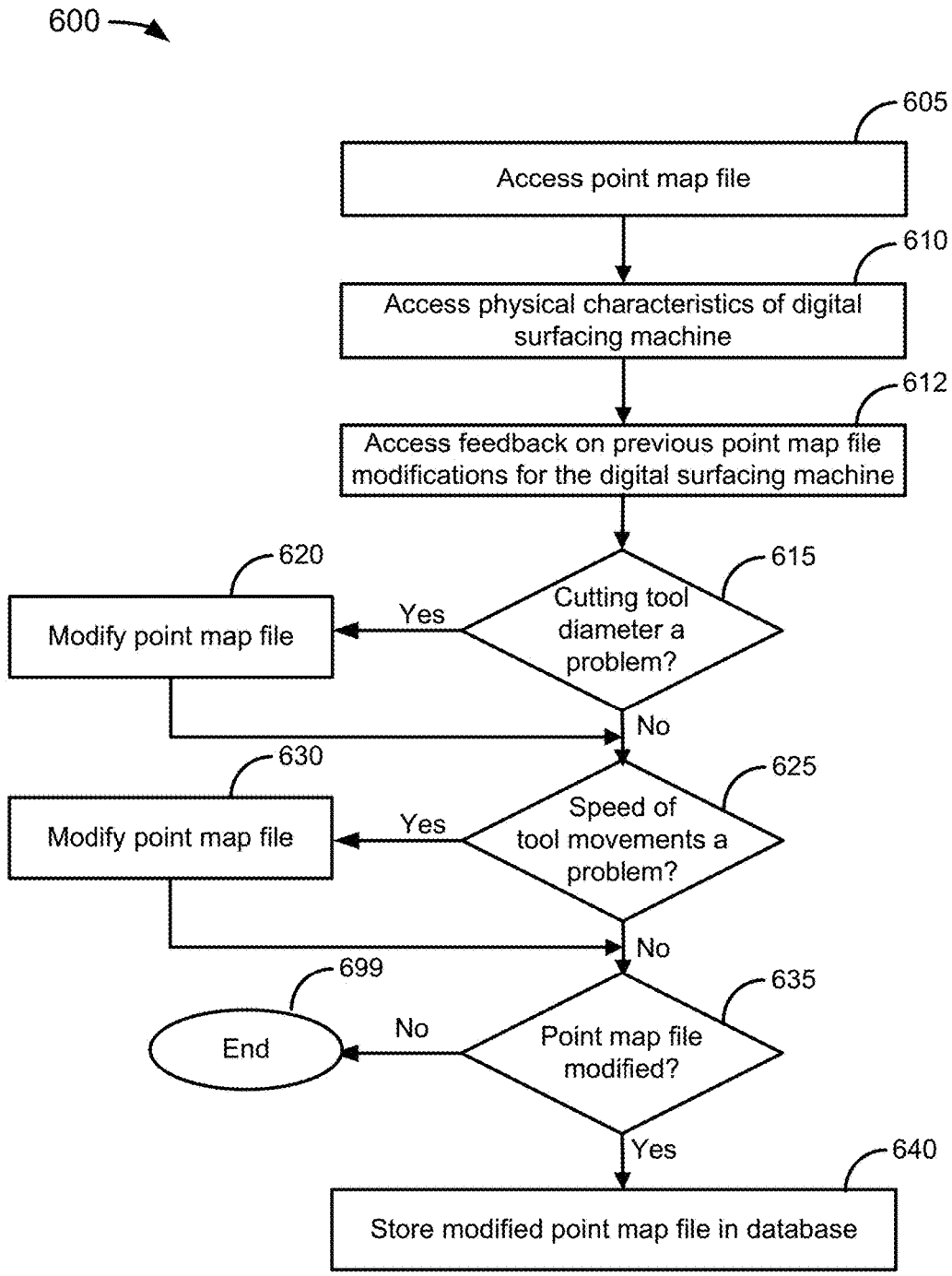
FIG. 6 is a flow chart illustrating an example method for modifying a point map file.

If the cursor has been moved on or near the laboratory brand on the work ticket (block 420—Yes), at block 425, the system accesses the database to determine the source information for the lens design used for manufacturing the lens and displaying the source information along with any other relevant parameters sent to the lens design server for generating the lens design, such as the type of lens blank for which the lens design should be designed. The accessed information may be displayed in a pop-up window that overlaps the displayed work ticket, such as shown in the example of FIG. 6. Other ways of displaying the source information may also be used, such as displaying the information in a fixed status bar on the screen.

FIG. 5A is an example work ticket where lens manufacturing instructions and parameters are displayed on a form 500A. The work ticket has several sections. The identification and contact information for the patient and/or the ECP are displayed in section 505, and the lens prescription information provided by the ECP is shown in section 510.

The lens information that describes the parts to be selected from inventory for manufacturing the lens are shown in section 520. Lens information includes the lens blank manufacturer, size of the lens blank, whether the required lens blank type is stocked, and the type of lens blank, for example, single vision, progressive, plastic, high index, polycarbonate, coated, or uncoated. The frame information for the eyeglasses is shown in section 525, for example, the style, color, and manufacturer, and whether the frame has a rim or is rimless.

Information relating to surfacing of the lens is displayed in section 530. The first line in section 530 provides information for laying the lens out for blocking and applying the block. The second line in section 530 provides information on how to set the generator, including the amount of prism needed, the base curve which creates the spherical power of the lens, and the cross curve which creates the cylindrical or astigmatic power of the lens. Prism can be induced in lenses for many reasons, for example, if the doctor prescribes a prism to be placed in front of the patient's optical center, by tilting the lens and inducing a prism, the optical center can be moved around on the lens. Sometimes the laboratory equipment requires that the prism is created at the blocker by tilting the holding device, other times the machine that cuts the curves on the back of the lens offsets and creates the prism. Also, a laboratory might have a different piece of equipment for processing a polycarbonate lens than for processing a glass lens or lens made of another material. Thus, the tooltip allows a laboratory technician to select the prism entry on the work ticket to see how the equipment is set up for a particular lens manufacturing job without having to reference a setup file that changes for different lenses.

The base and cross curves specified in the second line in section 530 are the curves to be cut into the lens by the generator. The third line in section 530 provides information on the tools used to produce the base and cross curves. The set of tool curves specifies the lap tools that are used to polish out the curves that are cut by the generator. Essentially, pads made of sandpaper are used to remove the rough marks of the machines that cut the curves and to produce an optical quality surface. Consequently, there is a difference between the first set of machine tool curves specified in the second line and the second set of surface curves specified in the third line that are created by the tool.

The surfacing information given in the second line of section 530 further includes the settings for the grinding machine that selects the thickness of the lens to be ground. The information in the second line provides the thickness of the blank and further shows calculational caliper checks that can be used to determine whether the edge of the surfaced lens has the correct thickness. Because different machines have different setup methods and different thickness settings that are particular to the type of generator being used by the laboratory, the tooltip can conveniently show a setting value that is different from the actual final thickness of the lens to be produced.

Further, the third line of section 530 provides base sag and cross sag parameters that are used by gauge measuring tools to ensure that the curves are cut the way the system calculates that the curves should be cut. A user can access the information using the tooltip by moving a cursor over the appropriate work ticket element, causing the information to be displayed. Thus, if the machine setting is not needed by the user, the additional information does not clutter up the work ticket.

Surfacing information can also include the technical details required to produce the appropriate curves on the selected lens blank, for example, the layout method, the reference point for the particular lens style, the lap tool precision and the lap tool pad thickness used in the lens calculation. These parameters are used by the laboratory technician to produce the lens and to check that the correct machines in the laboratory are used to produce the appropriate lens prescription. Thus, the tooltip can be used for proofing operations and for setting up a new piece of equipment in the laboratory.

Information relating to finishing of the lenses is displayed in section 535. The finishing information includes, but is not limited to, rolling the edges of the lens, polishing the lens, coating the lens, and tinting the lens.

For prescriptions that specify rimless frames, information on drilling of holes in the lens is needed. The holes have certain geometric requirements because a lens must have a minimum thickness to hold the mounting apparatus for the frame. The lens also has a maximum thickness imposed by the drilling equipment. Thus, the tooltip can provide information on drill-hole thicknesses in the lens. If the drill-hole thickness is not within an acceptable range, the prescription can be flagged as a problem. The drill-hole thickness information can be visualized using the tooltip functionality with the graphical work ticket described below in FIG. 5B.

Figure 5B:
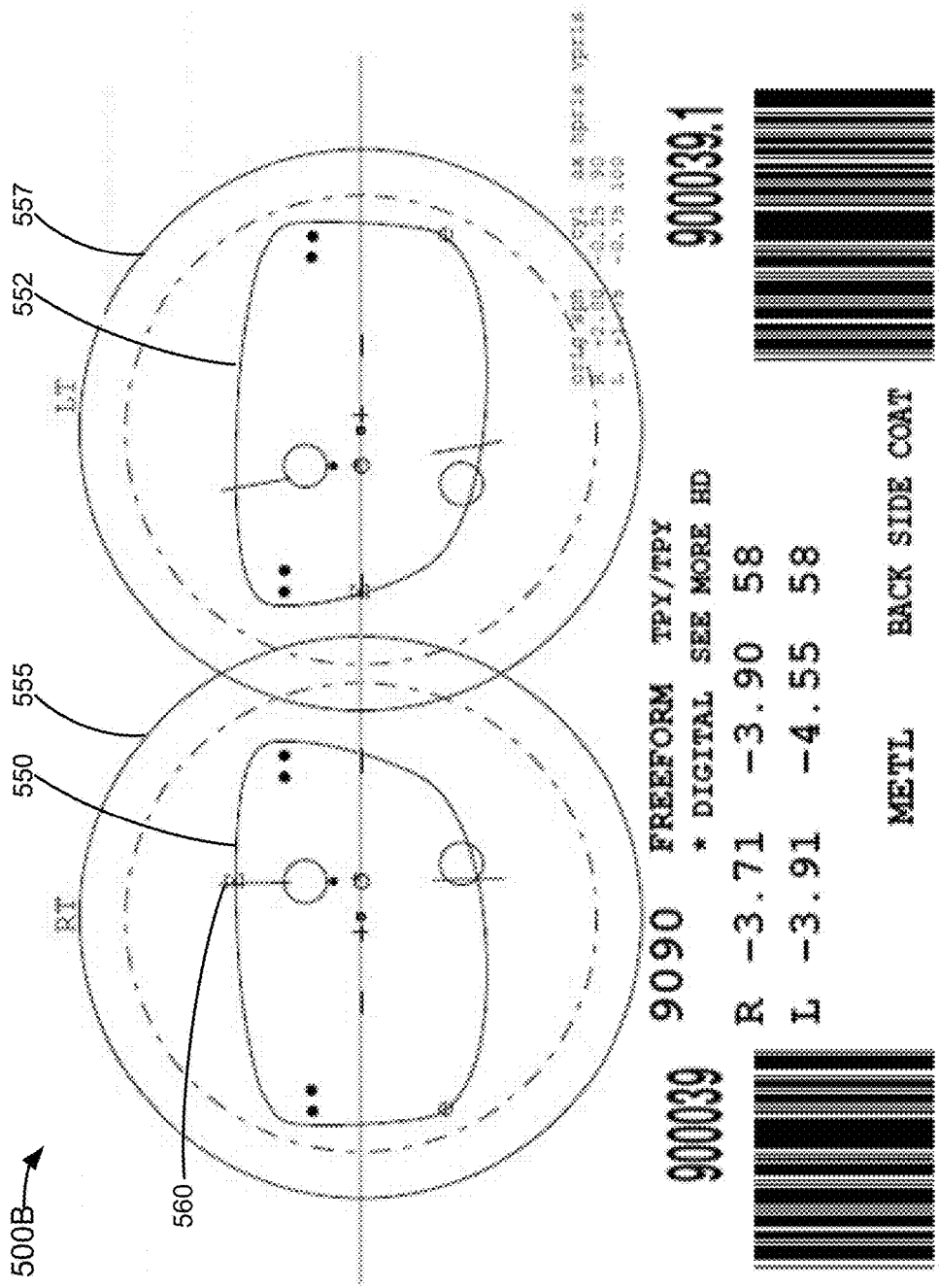
FIG. 5B shows an example work ticket showing lens processing parameters displayed in a graphical format.

FIG. 5B is an example work ticket showing cosmetic information about the lens manufacturing parameters displayed in a graphical format 500B. The work ticket graphic 500B shows the patient's right lens 550 on the left and the patient's left lens 552 on the right, the way the patient's lenses would be seen on the patient's face. The lenses are superimposed on images of the starting round lens blanks 555, 557 from which the lenses will be manufactured.

Also shown in the graphic 500B are some markings used by lens blank manufacturers. Because different lens blank manufacturers use different markings, it would be helpful for the lens technician to have a readily accessible definition of the markings available through the use of tooltips. Thus, if the technician making the lens points a cursor at one of the markings, the system can be programmed to display the meaning of the marking in a tooltip and any specific effects the marking will have on the lens being manufactured. For example, the letter "E" marking 560 as shown in FIG. 5B identifies the thickest point on the periphery of the lens to be manufactured. The optimum thickness of the lens at a specific point selected by the cursor can also be displayed in a tooltip to aid the technician in manufacturing the lens.

Tool information for producing the lenses are displayed in section 560 below the graphics of the lenses. Similar tooltip information is available as when hovering over the information in section 530 of the example work ticket form in FIG. 5A.

FIG. 6 is a flow chart illustrating an example method 600 for modifying a point map file corresponding to a lens design for a lens. At block 605, the smoothing system accesses the point map file stored in the database for a given lens to be manufactured. In some cases, the smoothing system can be notified by the LLP system and/or the lens design server when a new point map file has been stored in the database prior to use by the digital surfacing machine for machining the specified lens curvature on a lens blank. In some cases, a newly generated point map file can be sent directly to the smoothing system for analysis.

Then at block 610, the smoothing system accesses information about the physical characteristics of the digital surfacing machine that will use the point map file to surface the lens blank. In some instances, the facility at which the lens is manufactured can have more than one digital surfacing machine. Then the work order for the lens includes an indication of the specific digital surfacing machine to be used. Because the physical characteristics of the digital surfacing machines can differ from machine to machine, and even model to model, the smoothing system identifies the specific digital surfacing machine (and if necessary, model too) so that the characteristics stored in the database for that particular machine can be accessed. The characteristics of the digital surfacing machine can also include user modifications to a machine, for example, information about a cutting tool that is different from a standard cutting tool. The database that stores the characteristics of the digital surfacing machines can be the same or different from the database that stores the point map files.

Next, at block 612, the smoothing system accesses feedback data stored in a database. The feedback data provides information on how well modified point map files applied by a particular digital surfacing machine to a lens blank turned out. Thus, although mathematical calculations may be used in determining the maximum change in curvature of a lens surface producible by a digital surfacing machine with given physical characteristics, the actual performance of the digital surfacing machine may be different in practice. As an example, feedback data may include a map of quantitative differences between expected lens surface contours based on the modified point map file and the actual lens surface contours produced by the digital surfacing machine. The smoothing system can take the feedback data into account when modifying point map files for that particular digital surfacing machine.

The database that stores the feedback data can be the same or different from the database that stores the point map files and/or the characteristics of the digital surfacing machines. Feedback data can be uploaded automatically or manually into the database.

Figure 7:
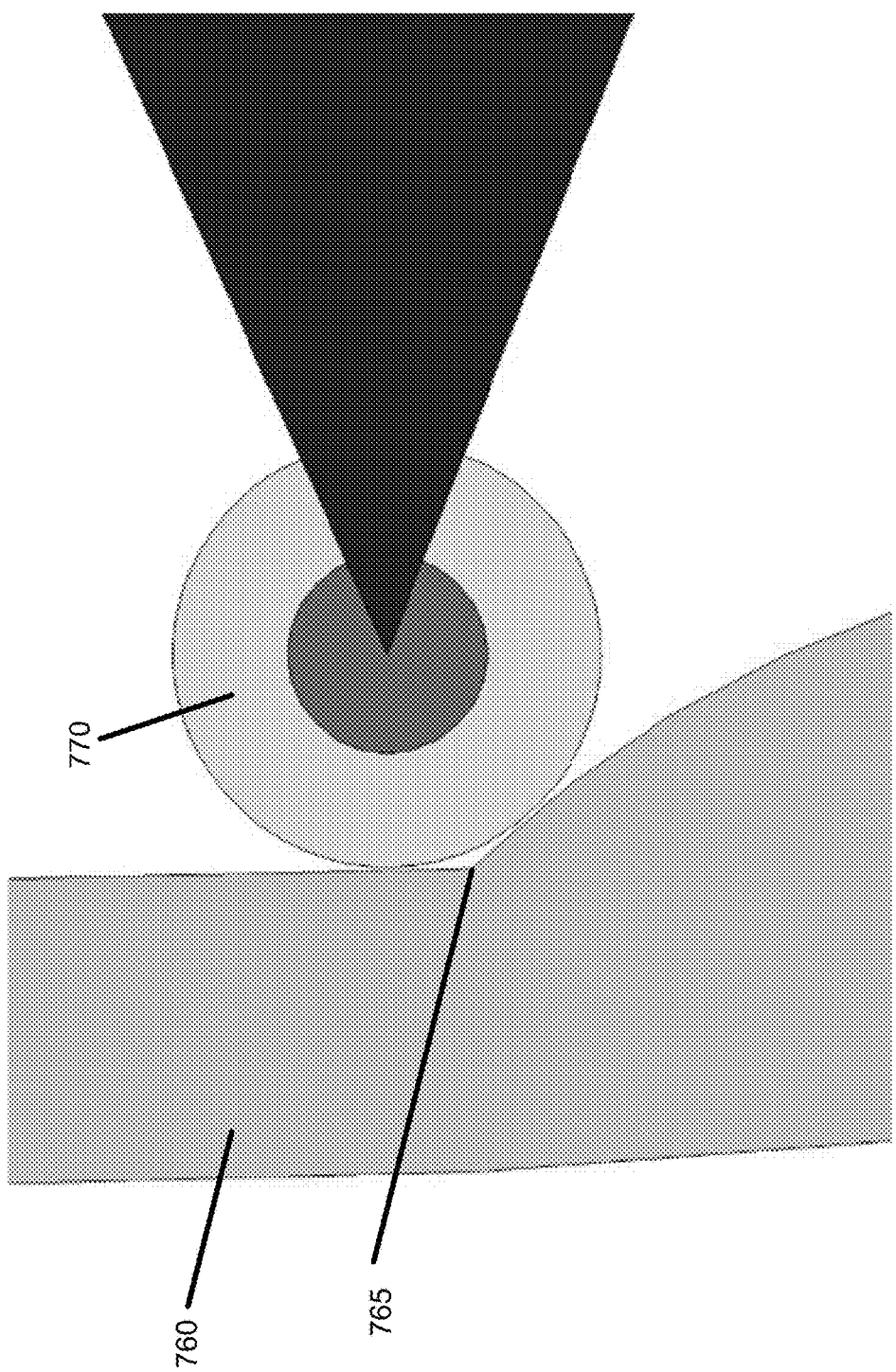
FIG. 7 shows a lens surface defined by a point map file that has an abrupt curvature change.

Then at decision block 615, the smoothing system determines whether the diameter of the cutting tool of the digital surfacing machine will allow the lens blank to be surfaced according to the specifications of the point map file. For example, the smoothing system can determine whether the curvatures of the lens surface defined by the point map file can be physically cut by the cutting tool for that specific machine. FIG. 7 shows an example of a lens 760 having a lens surface curvature defined by a point map file that designates an abrupt curvature change 765 in the lens surface. Also shown in FIG. 7 is an example digital surfacing machine that has a cutting tool 770 with a diameter that is physically too large to create the abrupt curvature change 765 in the lens surface. Thus, although the point map file is optimized for the patient's prescription, the cutting tool 770 of the digital surfacing machine is not physically capable of creating the surface defined by the point map file.

If the diameter of the cutting tool 770 is a problem (block 615—Yes), then at block 620, the smoothing system modifies the point map file to smoothe the appropriate curves to be cut on the surface of the lens blank such that the curves have a radius of curvature that is larger than the radius of curvature of the cutting tool. In some cases, the smoothing system will modify the point map file only if the modifications are outside of an optical zone specified by the work order, or only if the modifications are within a pre-specified magnitude if the modifications effect the optical zone of the lens. In some instances, a pre-determined threshold can be set for the percentage of the area of the optical zone that would be affected by a point map file modification, for example, if 90% or more of the optical zone is unaffected, the modifications are deemed acceptable and will be made. The reason is because modifications of the point map file away from a lens design optimized for a prescription can adversely affect the wearer of the lens.

Figure 8:
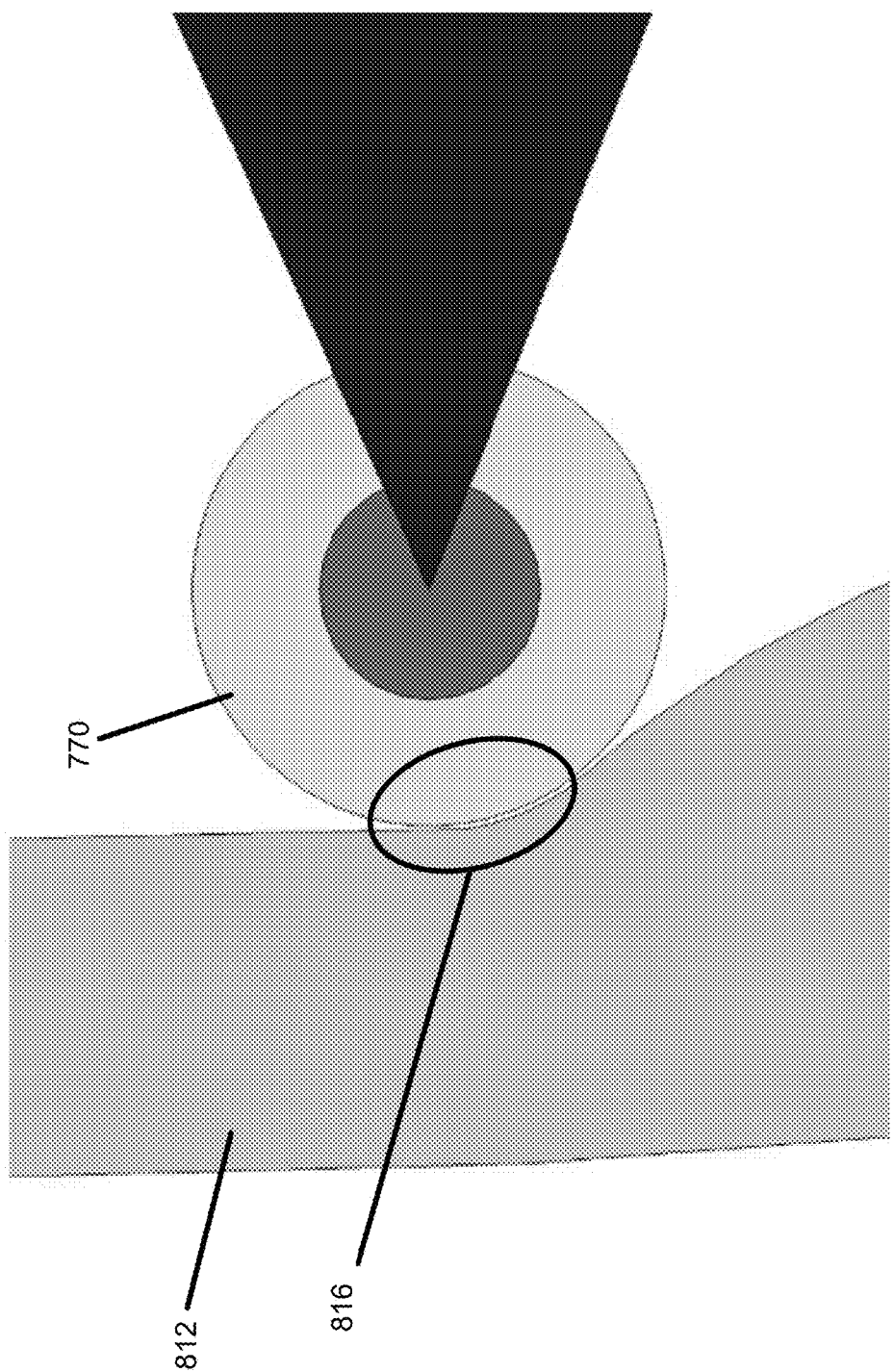
FIG. 8 shows a lens surface defined by a point map file that has a smooth curvature.

In modifying the point map file, the smoothing system can take into account any feedback data accessed at block 612. FIG. 8 shows a lens 812 defined by the modified point map file without an abrupt curvature change 765. Rather, the surface of the lens 812 has a smoothed area 816 in the region that previously had the abrupt curvature change 765. The curvature of the smoothed area 816 is designed by the smoothing system to be able to be surfaced by the digital surfacing machine using the cutting tool 770 with the known diameter. The process continues at decision block 625.

In some cases, the cutting tool used by the digital surfacing machine may be a single point cutter that does not have a diameter that is too large to cut an abrupt lens surface curvature, or the lens surface curvature defined by the original point map file from the lens design server may not be too abrupt for a given cutting tool diameter. However, in these scenarios, a curve change defined by the point map file may still not be physically possible for the digital surfacing machine to create because the cutting tool may not be able to move sufficiently fast relative to the surface of the lens to create the curve, as described below.

If the diameter of the cutting tool is not a problem (block 615—No), then at decision block 625, the smoothing system determines whether the speed of the tool movements of the digital surfacing machine will be a problem for surfacing the lens blank based on the specified point map file.

Figure 9A:
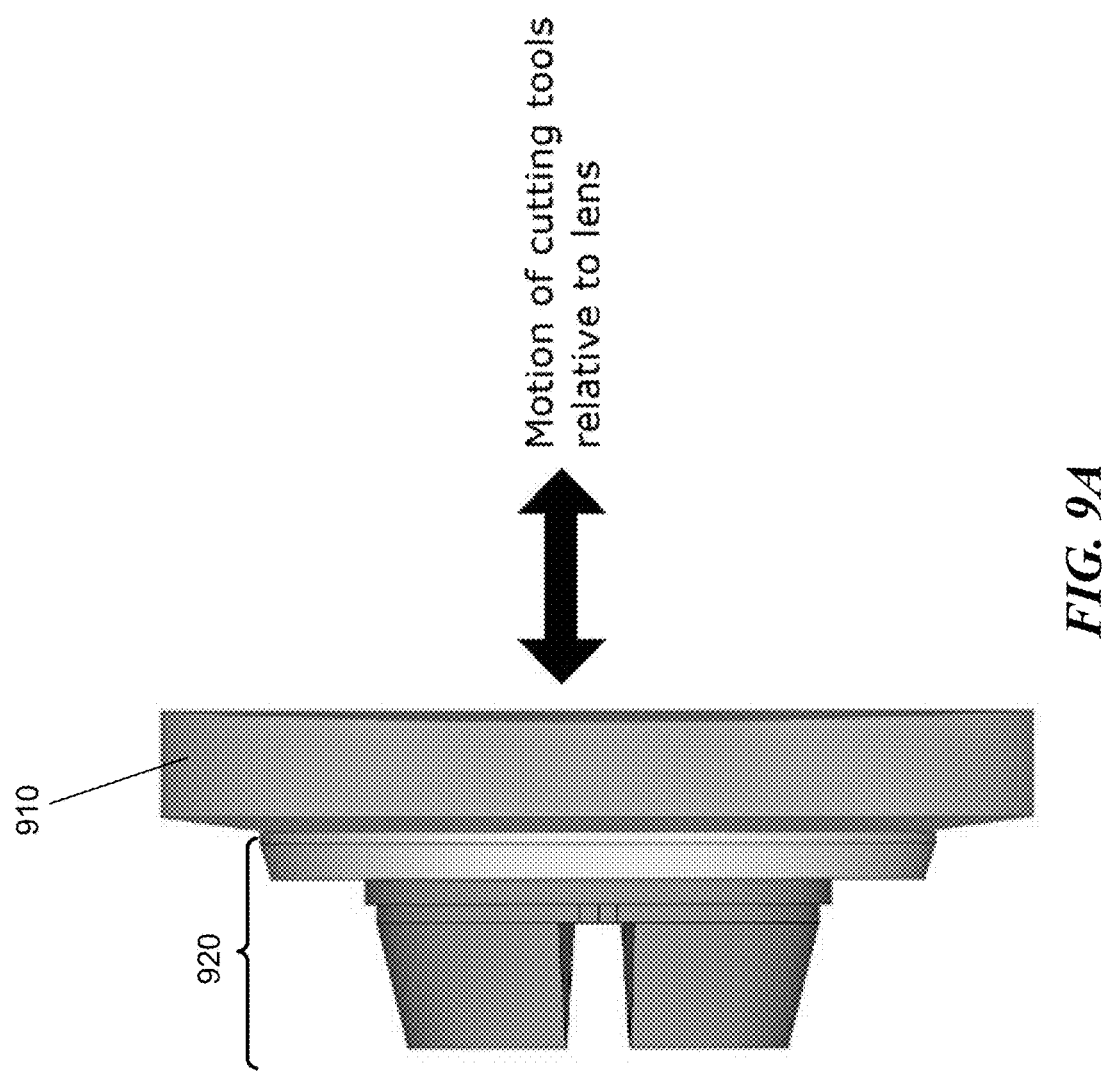
FIG. 9A shows a lens blank that is attached to a block that is used to hold the lens blank during the lens grinding and polishing processes

The rate at which tool movements can be made by the digital surfacing machine can be understood by considering the positioning of the lens blank with respect to the cutting tool of the digital surfacing machine. FIG. 9A shows a lens blank 910 attached to a block 920 that is used to hold the lens blank 910 during the lens grinding and polishing processes.

Figure 9B:
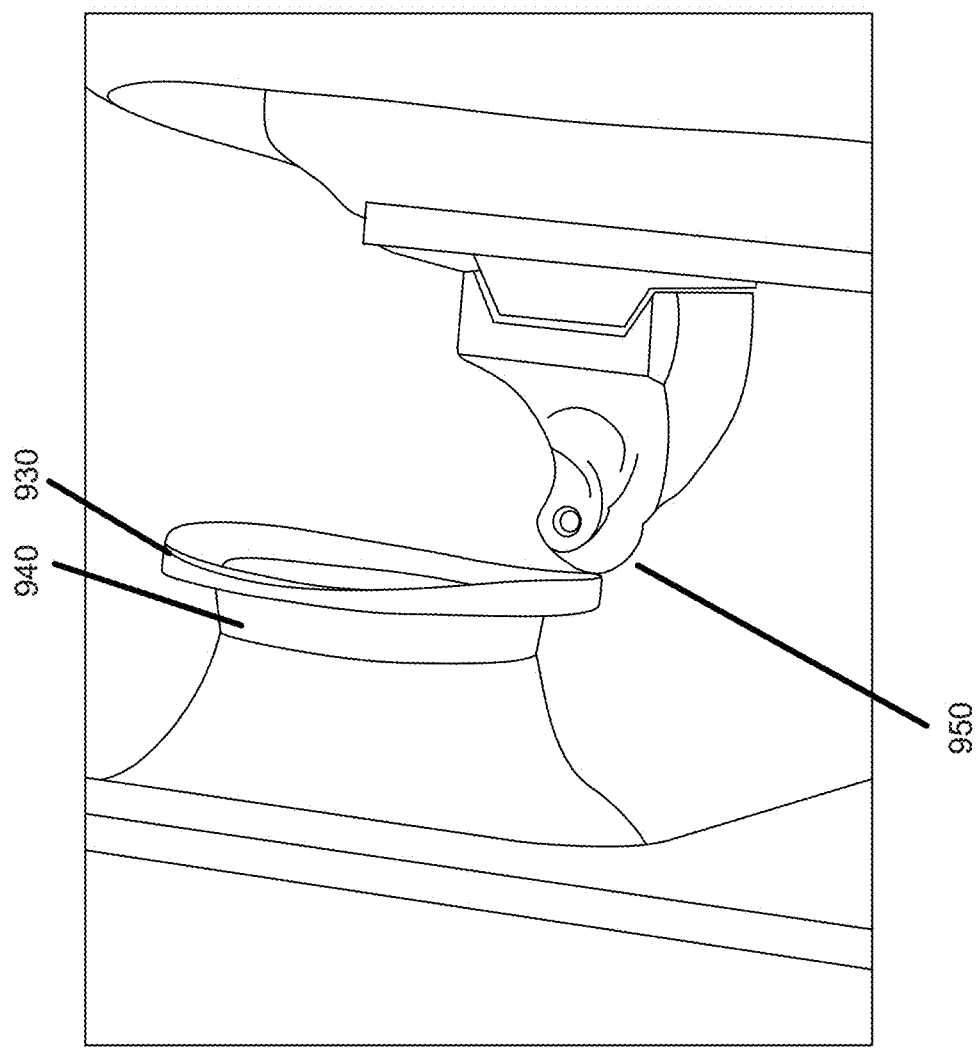
FIG. 9B is a photograph of a portion of a lens grinding machine showing a lens blank fused to a block.

FIG. 9B is a photograph of a portion of a lens grinding machine where the lens blank 930 is fused to a block 940. During surfacing of the lens blank 910, the lens blank 930 and lens block 940 are rotated while the cutting tool 950 surfaces the lens blank 930.

Figure 10:
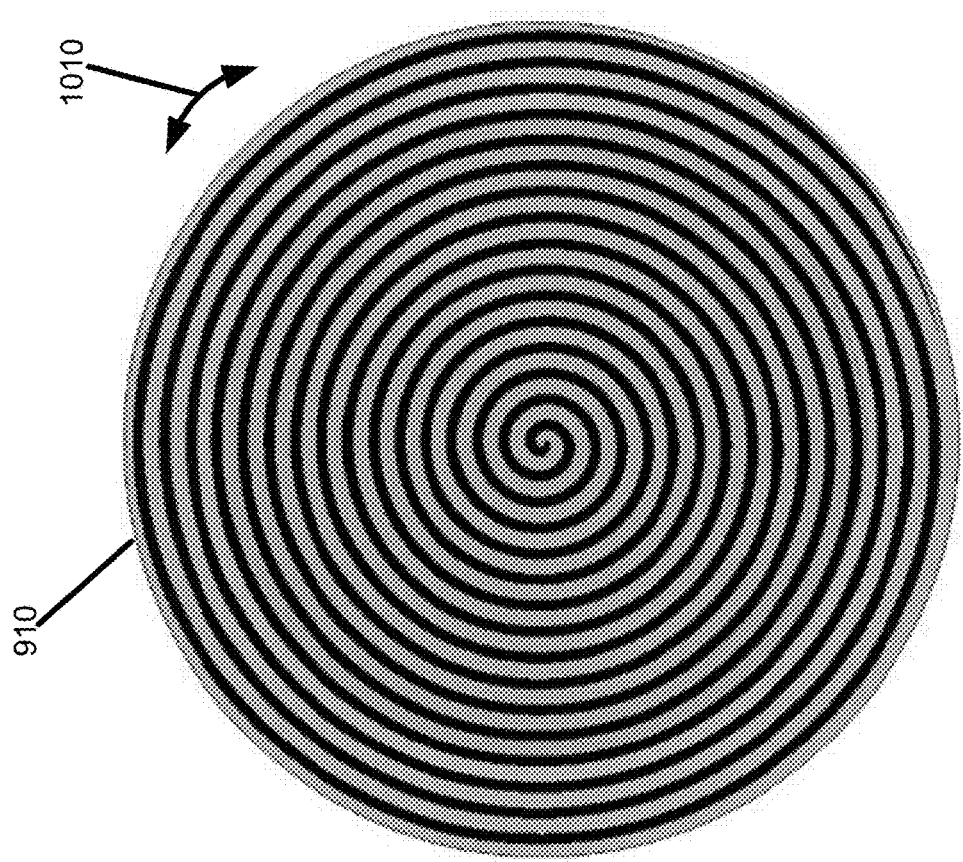
FIG. 10 shows a lens blank machined in a spiral pattern.

The cutting tool 950 can move along different axes. As shown in FIG. 9A, the cutting tool 950 can move directly toward and away from the lens blank, in a direction generally perpendicular to the lens blank. The cutting tool 950 can also move radially between the outer edge of the lens blank 910 and the center of the lens blank 910. Because the lens blank can be rotated during the surfacing process either clockwise or counterclockwise, as indicated by the arrows 1010 in FIG. 10, the cutting tool 950 can cut a spiral path on the surface of the lens blank 910 when the cutting tool 950 moves radially. The speed of the movements of the cutting tool 950 and the speed of the rotating lens blank 910 contribute to determining the steepest curve that can be surfaced on the lens blank. For example, if a steep curve is specified by the point map file, but the cutting tool 950 is unable to move quickly enough away from the lens to produce the curve on the lens surface, then even if the cutting tool 950 were a single point diamond cutter with a very small effective radius, the digital surfacing machine would not be able to physically produce the surface defined by the point map file generated by the lens design server. Additionally, if the cutting tool tries to move too quickly, it may bounce on the surface of the lens, resulting in the creation of unwanted ruts on the lens.

An example of an abrupt change in lens curvature is described in U.S. Pat. No. 8,002,406, where the curvature of the back surface of the lens at a region near the periphery of the lens blank is designed to have a surface curvature different from the curvature of the back surface of the lens at a central portion of the lens. The transition from the curvature of the lens at the central region to the peripheral portion of the lens can be abrupt. This type of abrupt curvature change can be adjusted by the smoothing system to create a curvature change that can be surfaced by the digital surfacing machine.

If the speed of the tool movements is a problem (block 625—Yes), then at block 630, the smoothing system modifies the point map file to reduce the steepness of the curves to a maximum steepness that is capable of being generated by the digital surfacing machine with the given speed restrictions on the tooling. Similar to the discussion above, in some cases, there are restrictions on the modifications to the point map file depending on where on the lens the modifications will be made and/or the magnitude of the modifications. In modifying the point map file, the smoothing system can take into account the feedback data accessed at block 612. The process returns to decision block 635.

If the speed of the tool movements is not a problem (block 625—No), at decision block 635, the smoothing system determines whether the point map file has been modified during the point map file modification process 600. If the point map file has not been modified (block 635—No), the process ends at block 699. If the point map file has been modified (block 635—Yes), at block 640, the smoothing system stores the modified point map file in the database. The modified point map file will then be used by the digital surfacing machine to surface the lens blank. The modified point map file stored in the database can be associated with the originally generated point map file created by the lens design server so that the original point map file can be modified to work with a different digital surfacing machine, if necessary. In some instances, the location in the database of the stored modified point map file is also provided to the work order so that the digital surfacing machine can retrieve the modified point map file for creating the specified lens surface.

Figure 11:
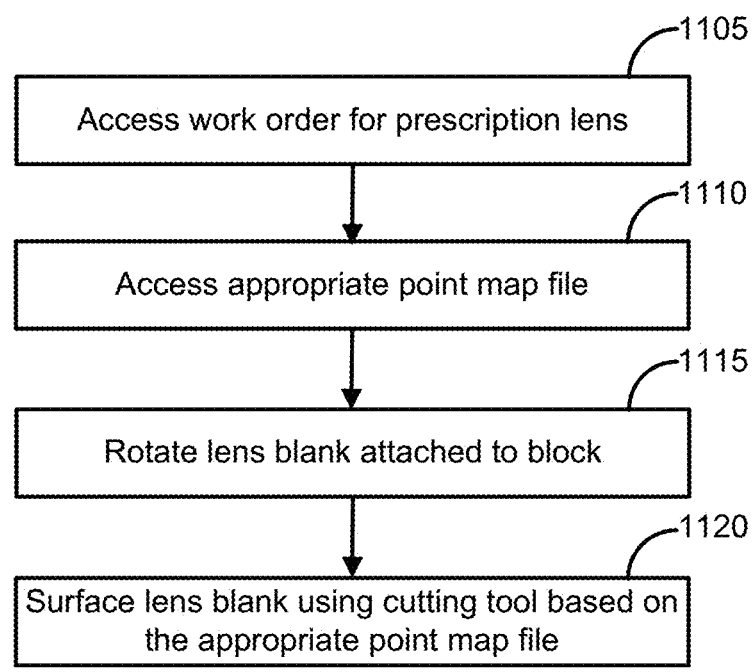
FIG. 11 is a flow chart illustrating an example method for surfacing a lens.

FIG. 11 is a flow chart illustrating an example method for surfacing a lens. At block 1105, the digital surfacing machine accesses the work order for manufacturing a specific prescription lens. The work order specifies a particular point map file that has been generated by the lens design server. If the smoothing system has modified the point map file, in some cases, there is an indication in the work order as to the specific modified point map file to be used, such as the location of the modified point map file in the database. In some cases, the original point map file can be replaced by the modified point map file. Then at block 1110, the digital surfacing machine access the appropriate point map file for the lens.

Next, at block 1115, the digital surfacing machine rotates the lens blank that is attached to a block. And at block 1120, the digital surfacing machine surfaces the lens blank using a cutting tool. The surfacing of the lens blank is performed according to the specifications of the point map file.

Suitable Systems

Figure 12:
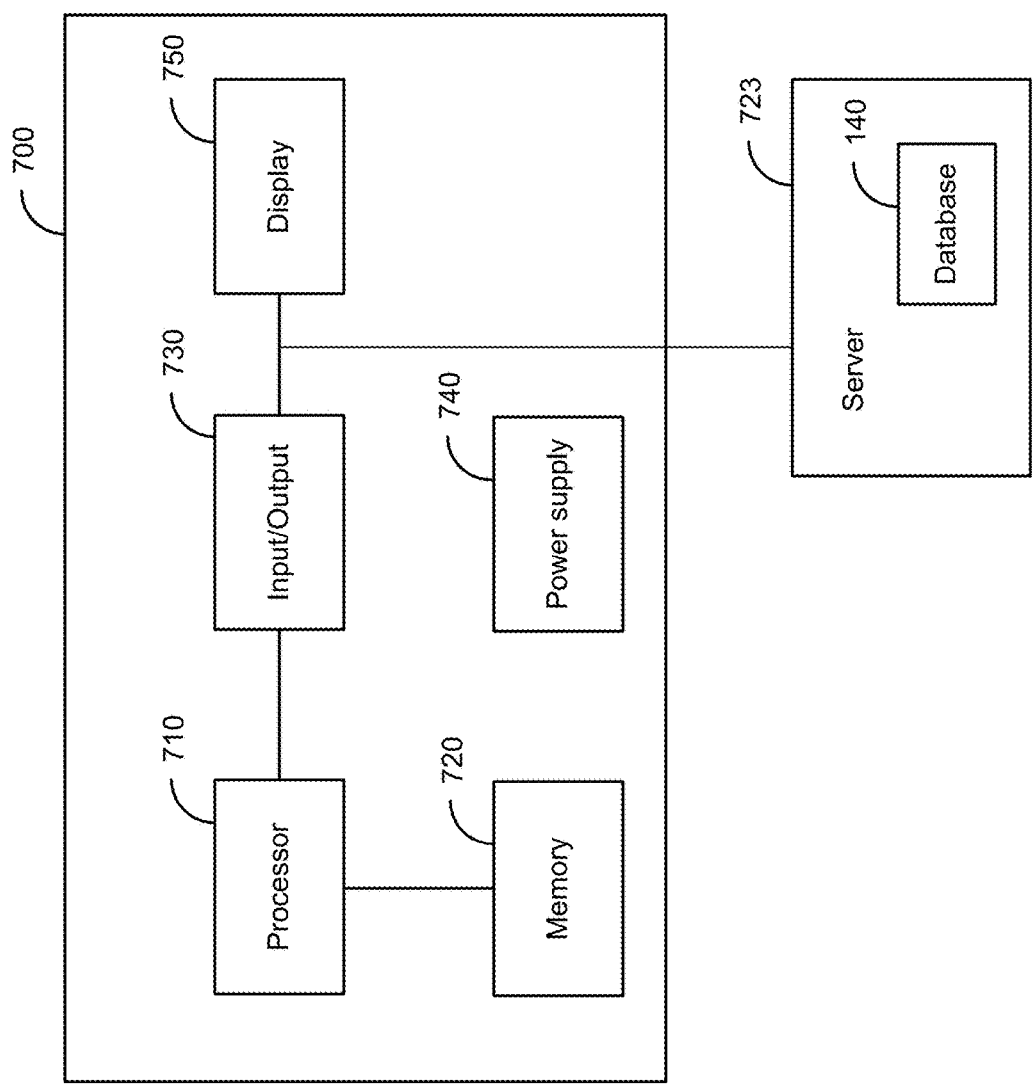
FIG. 12 depicts a block diagram illustrating an example of a user interface system that displays source information for a lens design for a lens manufacturing work ticket.

FIG. 12 depicts a block diagram illustrating an example of an LLP system 700 that displays source information through the use of tooltips for a lens design that is used in manufacturing a lens. The LLP system 700 can include one or more processors 710, memory units 720, input/output devices 730, power supplies 740, and displays 750. In some embodiments, the LLP system 700 can access a server 723 that has one or more databases 140. Alternatively, the LLP system 700 can include the server 723 and databases 140.

A processor 710 can be used to control the LLP system 700. Memory units 720 include, but are not limited to, RAM, ROM, and any combination of volatile and non-volatile memory. Input/output devices 730 can include, but are not limited to, triggers to start and stop the LLP system 700, visual displays, speakers, and communication devices that operate through wired or wireless communications, such as a mouse for controlling a cursor. In some embodiments, the input/output device 730 can communicate with the server 723 that has one or more databases 140. The server 723 provides access to data stored in the database 140, such as source information for lens designs to be displayed using tooltips, and other additional information.

A power supply 740 can include, but is not limited to, a battery. A display 750 can include, but is not limited to, an electronic display, and can be a touchscreen display.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the embodiments is not intended to be exhaustive or to limit the embodiments to the precise form disclosed above. While specific examples for the embodiments are described above for illustrative purposes, various equivalent modifications are possible within the scope of the embodiments, as those skilled in the relevant art will recognize. For example, while lenses for eyeglasses are mentioned, any type of lens may be processed under the principles disclosed herein. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the embodiments.

Any patents and applications and other references noted above, including any that may be listed in accompanying filing papers, are incorporated herein by reference. Aspects of the embodiments can be modified, if necessary, to employ the systems, functions, and concepts included in such references to provide further implementations of the embodiments.

These and other changes can be made to the embodiments in light of the above Detailed Description. While the above description describes certain examples of the embodiments, and describes the best mode contemplated, no matter how detailed the above appears in text, the embodiments can be practiced in many ways. Details of the system may vary considerably in its specific implementation, while still being encompassed by the embodiments disclosed herein. As noted above, particular terminology used when describing certain features or aspects of the embodiments should not be taken to imply that the terminology is being redefined herein to be restricted to any specific characteristics, features, or aspects of the embodiments with which that terminology is associated. In general, the terms used in the following claims should not be construed to limit the embodiments to the specific examples disclosed in the specification, unless the above Detailed Description section explicitly defines such terms. Accordingly, the actual scope of the embodiments encompasses not only the disclosed examples, but also all equivalent ways of practicing or implementing the embodiments under the claims.

While certain aspects of the embodiments are presented below in certain claim forms, the applicant contemplates the various aspects of the embodiments in any number of claim forms. For example, while only one aspect of the embodiments is recited as a means-plus-function claim under 35 U.S.C. § 112, sixth paragraph, other aspects may likewise be embodied as a means-plus-function claim, or in other forms, such as being embodied in a computer-readable medium.

(Any claims intended to be treated under 35 U.S.C. § 112, ¶6 will begin with the words "means for.") Accordingly, the applicant reserves the right to add additional claims after filing the application to pursue such additional claim forms for other aspects of the embodiments.

We claim:

1. A computer-implemented method, comprising:

accessing a first map file stored in a first database,
wherein the first map file is generated based on an ophthalmic lens prescription, and
wherein the first map file defines a first lens contour having an optical zone;

accessing information stored in a second database about one or more physical characteristics of a lens grinding apparatus;

determining, based upon the one or more physical characteristics of the lens grinding apparatus, that the lens grinding apparatus will produce an error on a lens blank for at least a portion of the first lens contour;

generating modifications to the first map file based upon the physical characteristics of the lens grinding apparatus;

determining that the modifications are (a) only to an area of the first lens contour outside the optical zone or (b) to an area of the first lens contour inside the optical zone and are less than a threshold magnitude; and modifying the first map file based on the generated modifications,
wherein the modified map file defines a second, different lens contour producible on the lens blank using the lens grinding apparatus.

2. The computer-implemented method of claim 1 wherein at least a portion of the second lens contour is less steep, has a larger radius of curvature, or is both less steep and has a larger radius of curvature, than a corresponding portion of the first lens contour.

3. The computer-implemented method of claim 1 wherein— the physical characteristics of the lens grinding apparatus include a first radius of curvature of a cutting tool of the lens grinding apparatus, and the portion of the first lens contour is not producible on the lens blank using the lens grinding apparatus because the first lens contour has a second radius of curvature that is smaller than the first radius of curvature.

4. The computer-implemented method of claim 1 wherein— the physical characteristics of the lens grinding apparatus include a movement rate of a cutting tool of the lens grinding apparatus and a rotational speed of a lens block of the lens grinding apparatus, and at least a portion of the second lens contour is less steep than a corresponding portion of the first lens contour.

5. The computer-implemented method of claim 4 wherein the movement rate of the cutting tool includes a first rate at which the cutting tool moves radially relative to the lens blank and a second rate at which the cutting tool moves away or toward the lens blank.

6. The computer-implemented method of claim 1, further comprising:

accessing feedback data stored in a third database about a performance of the lens grinding apparatus in creating a specific lens surface based on a specific modified point map file; and modifying the first map file based further on the feedback data.

7. The computer-implemented method of claim 1, further comprising physically surfacing the lens blank, at the lens grinding apparatus, based on the modified map file.

8. A system comprising:
a memory component storing:
a description of one or more physical characteristics of a surfacing machine, and
a first point map file generated based on a lens prescription, wherein the first point map file defines a first lens surface having an optical zone; and
a processor coupled to the memory component, wherein the processor is configured to:
determine, based upon the one or more physical characteristics of the surfacing machine, that the surfacing machine will produce an error on a lens blank for at least a portion of the first lens surface,
generate modifications to the first point map file based upon the physical characteristics of the surfacing machine, and
modify the first point map file based on the generated modifications if:
(a) the modifications are only to an area of the first lens surface outside the optical zone, or
(b) the modifications are to an area of the first lens surface inside the optical zone and are less than a threshold magnitude,
wherein the modified point map file defines a second, different lens surface producible on the lens blank using the surfacing machine.

9. The system of claim 8 wherein at least a portion of the second lens surface is less steep, has a larger radius of curvature, or is both less steep and has a larger radius of curvature, than a corresponding portion of the first lens surface.

10. The system of claim 8 wherein—
the physical characteristics of the surfacing machine include a first radius of curvature of a cutting tool of the surfacing machine, and
the portion of the first lens surface is not producible on the lens blank using the surfacing machine because the first lens surface has a second radius of curvature that is smaller than the first radius of curvature.

11. The system of claim 8 wherein—
the physical characteristics of the surfacing machine include a movement speed of a cutting tool of the surfacing machine, and
at least a portion of the second lens surface is less steep than a corresponding portion of the first lens surface.

12. The system of claim 11 wherein the physical characteristics of the surfacing machine further include a rotational speed of a lens block of the surfacing machine, wherein the lens block secures the lens blank.

13. The system of claim 8 wherein the surfacing machine is configured to physically surface the lens blank based on the modified point map file.

14. The system of claim 8 wherein the memory component further stores feedback data about a performance of the surfacing machine in creating a specific lens surface based on a specific modified point map file, and further wherein the processor is configured to modify the first point map file based on the feedback data.

15. The system of claim 8 wherein the memory component further stores the modified point map file and associates the modified point map file with the first point map file.

16. A non-transitory computer-readable medium comprising instructions configured to cause one or more processors to perform a method for modifying a point map file used on a lens surfacing machine, the method comprising:
receiving a first point map file,
wherein the first point map file is generated based on an ophthalmic lens prescription, and
wherein the first point map file defines a first lens surface having an optical zone;
receiving information about one or more physical characteristics of the lens surfacing machine;
determining, based upon the one or more physical characteristics of the lens surfacing machine, that at least a portion of the first lens surface is not producible on the lens blank using the lens surfacing machine;
generating modifications to the first point map file based upon the physical characteristics of the lens surfacing machine;
determining that the modifications are (a) only to an area of the first lens surface outside the optical zone or (b) to an area of the first lens surface inside the optical zone and are less than a threshold magnitude; and
modifying the first point map file based on the generated modifications,
wherein the modified point map file defines a second, different lens surface producible on the lens blank using the lens surfacing machine; and
instructing the lens surfacing machine to physically surface the lens blank based on the modified point map file.

17. The non-transitory computer-readable medium of claim 16 wherein—
the physical characteristics of the surfacing machine include a radius of curvature and a movement speed of a cutting tool of the lens surfacing machine, and
the portion of the first lens surface is not producible on the lens blank using the lens surfacing machine because it has a steepness above a threshold magnitude.

18. The non-transitory computer-readable medium of claim 17 wherein the movement speed of the cutting tool includes a first speed at which the cutting tool moves radially relative to the lens blank and a second speed at which the cutting tool moves away or toward the lens blank.

19. The non-transitory computer-readable medium of claim 18 wherein the physical characteristics of the lens surfacing machine further include a rotational speed of a lens block of the surfacing machine, wherein the lens block secures the lens blank.

20. The non-transitory computer-readable medium of claim 17 wherein at least a portion of the second lens surface is less steep and has a larger radius of curvature than a corresponding portion of the first lens surface.

* * * * *